United States Patent [19]

DeBell et al.

[11] Patent Number: 5,327,813
[45] Date of Patent: Jul. 12, 1994

[54] WRIST PIN HAVING A CERAMIC COMPOSITE CORE

[75] Inventors: George C. DeBell, Plymouth; Richard L. Allor, Livonia; Ernest D. Stiles, St. Clair Shores, all of Mich.

[73] Assignee: Ford Motor Company, Dearborn, Mich.

[21] Appl. No.: 897,631

[22] Filed: Jun. 12, 1992

[51] Int. Cl.⁵ ................................................. F16J 1/14
[52] U.S. Cl. ........................................ 92/187; 92/222; 123/193.6
[58] Field of Search ................. 92/172, 187, 208, 248, 92/222; 74/44, 579 E; 29/888.05, 447; 403/150

[56] References Cited

U.S. PATENT DOCUMENTS

| | | | |
|---|---|---|---|
| 3,960,581 | 6/1976 | Cutler | 106/65 |
| 4,406,558 | 9/1983 | Kochendorfer et al. | 403/150 X |
| 4,430,906 | 2/1984 | Holtzberg et al. | 29/888.05 X |
| 4,456,653 | 6/1984 | Ruegg et al. | 403/150 X |
| 4,548,125 | 10/1985 | Huther | 92/187 |
| 4,572,058 | 2/1986 | Hinz et al. | 92/187 |
| 4,696,224 | 9/1987 | Mishima | 92/187 |
| 4,697,325 | 10/1987 | Kamagatto et al. | 29/447 |
| 4,796,517 | 1/1989 | Akao et al. | 92/187 |
| 4,909,132 | 3/1990 | Kling et al. | 92/190 |
| 4,964,332 | 10/1990 | Sawyer | 92/187 |
| 4,984,544 | 1/1991 | DeBiasse | 123/197 |
| 5,029,562 | 7/1991 | Kamo | 92/155 X |
| 5,039,285 | 8/1991 | Lindstrom | 417/368 |
| 5,063,831 | 11/1991 | Byard | 92/187 |
| 5,066,173 | 11/1991 | Gaffan et al. | 408/59 |
| 5,076,149 | 12/1991 | Everts | 92/208 |
| 5,112,780 | 5/1992 | Goto et al. | 501/95 |
| 5,114,262 | 5/1992 | Kojima | 92/187 X |

Primary Examiner—Edward K. Look
Assistant Examiner—John Ryznic
Attorney, Agent, or Firm—Roger L. May; Joseph W. Malleck

[57] ABSTRACT

An engine component assembly is disclosed having a bi-material wrist pin which secures a piston rotatably to an associated connecting rod. The bi-material wrist pin includes a cylindrical ceramic core. Surrounding the cylindrical core is a tubular shell which fixedly secures the core in relation to the shell. The shell rotatably cooperates with the piston and is fixed in relation to the connecting rod.

13 Claims, 1 Drawing Sheet

WRIST PIN HAVING A CERAMIC COMPOSITE CORE

BACKGROUND OF THE INVENTION

1. Field Of The Invention

This invention relates to an engine component assembly, and more particularly to wrist pins for deployment therein.

2. Related Art Statement

The implications of mass reduction in reciprocating components of piston engines is well defined. Two strategies are conventionally utilized to take advantage of reduced mass: power may be increased by a factor proportional to the mass reduction by allowing the dynamic loads to remain constant while increasing the engine speed (if valve train components are upgraded simultaneously); or fuel economy benefits may be realized by reducing mass and associated friction, while maintaining a constant engine speed.

Numerous reciprocating piston engines are known which utilize a piston pivotally connected to a connecting rod by a wrist pin. In use, the piston forms a movable gas-tight plug which confines a charge within a cylinder and transmits to the connecting rod forces generated by combustion of the charge. Since the piston forms a guide and a bearing for a piston-connecting end of the connecting rod, the piston operates under lateral thrust due to an oblique inclination of that rod. Wrist pin bosses are formed within the skirt located on the underside of the piston. If the wrist pin is fixed in relation to the connecting rod, and the wrist pin pivots freely within holes defined in wrist pin bosses, the lateral thrust loading tends to be distributed over a large bearing area.

Ideally, the combined weight of the piston and wrist pin is kept to a minimum to reduce vibration and the inertial loading on related bearings, and to avoid friction and other losses entailed in accelerating the piston/wrist pin in both directions.

Design considerations for piston/wrist pins include anticipating and accommodating considerable variation in operating temperatures—from starting cold, to very high temperatures at maximum output. Superimposed upon these variations are those which may be encountered in any given geographic location.

Thermal flow in a piston is from a crown, then outwardly out to a ring belt, whence heat is transferred through rings to cylinder walls (and thence to a coolant). The wrist pin is subjected to those thermal variations by heat transferred down to the skirt and across the bearing surfaces.

In modern internal combustion engines, if the height of the piston is reduced, the wrist pin becomes deployed more closely to the hot crown. As a result, lubricating difficulties are experienced due to the higher loads imposed by increased engine performance and higher operating temperatures.

Virtually all pistons are tapered from top to bottom. This compensates for differing expansion due to thermal gradients and variations in thickness of metal needed to transmit the gas and inertial loading from the crown to wrist pin bosses.

The wrist pin may be one of the most highly stressed engine components. Wrist pins must withstand bending, compression, and shear stresses without significant deformation over time in varying conditions of loading and temperature. If the wrist pin is unable to resist significant bending forces, the fatigue behavior of the associated wrist pin bosses will be adversely affected. If sub-optimal materials or dimensions are selected, partial seizure or scuffing may occur in the wrist pin bosses due to the very small clearances which are generally provided.

Where lighter pistons are used, the wrist pin contributes to a higher proportion of the total mass of the piston and wrist pin. In several cases, the wrist pin may account for 30%–40% of the total piston-wrist pin mass.

If the wrist pin is formed from a substantial mass of a suitable metallic material, it will generally not fail catastrophically, since deformation is likely to be limited to the elastic range. Nevertheless, the search resumes for suitable materials that may provide an increase in stiffness of the wrist pin.

Although many wrist pins in use today are made of case-hardened steel, some have been developed which are entirely formed from a ceramic material. Such approaches tend to suffer from the inability of present designs to resist failure of the pin and contain fracture debris to avoid catastrophic failure of associated engine components. Adverse damping characteristics of an all-ceramic wrist pin also adversely impact the noise associated with an oscillated piston/pin/connecting rod assembly. Additionally, to minimize friction, the outside diameter of ceramic piston pins need to be ground to achieve a desired surface texture. Accordingly, it would be desirable to provide a design wherein the outside diameter of a metal shell is in stationary contact with adjacent ceramic material and in rotary contact with associated wrist pin bosses, thereby avoiding the need for potentially expensive post-forming operations, such as grinding.

SUMMARY OF THE INVENTION

In light of such design needs, the wrist pin of the present invention is deployed within an engine component assembly wherein a piston has a pair of coaxially spaced apart holes disposed along a longtitudinal axis. The holes are diametrically opposed from each other. A bi-material wrist pin extends between and within the holes.

The wrist pin has a cylindrical core which is disposed coaxially with the longtitudinal axis. Surrounding the cylindrical core is a tubular shell which fixedly secures the cylindrical core. The shell rotatably cooperates with the holes provided within the wrist pin bosses of the piston.

Accordingly, it is an object of the present invention to provide a wrist pin for an internal combustion engine having a reduced mass and increased stiffness without significant increase in production costs.

Another object of the present invention to provide a simple, low-cost wrist pin which can be securely and reliably positioned in relation to the piston.

It is also an object of the present invention to take advantage of favorable stiffness and weight properties of ceramic material, while providing a suitable metallic tubular surface which is in stationary contact with adjacent ceramic material and the connecting rod, while in rotational contact with the piston, thereby minimizing frictional losses between the piston and wrist pin.

Another object of the present invention is to avoid the need for potentially expensive post-forming operations.

To reduce mass even further, another object of the present invention lies in providing an axially extending bore defined within the cylindrical ceramic core of the wrist pin.

It is still another object of the present invention to provide a method for making a bi-material wrist pin with favorable mechanical properties using method steps which are straight forward and cost-effective.

The advantages of the present invention will be apparent from the drawings, the following description, and the appended claims.

DETAILED DESCRIPTION OF THE BEST MODE(S) FOR PRACTICING THE PRESENT INVENTION

Figure 1:
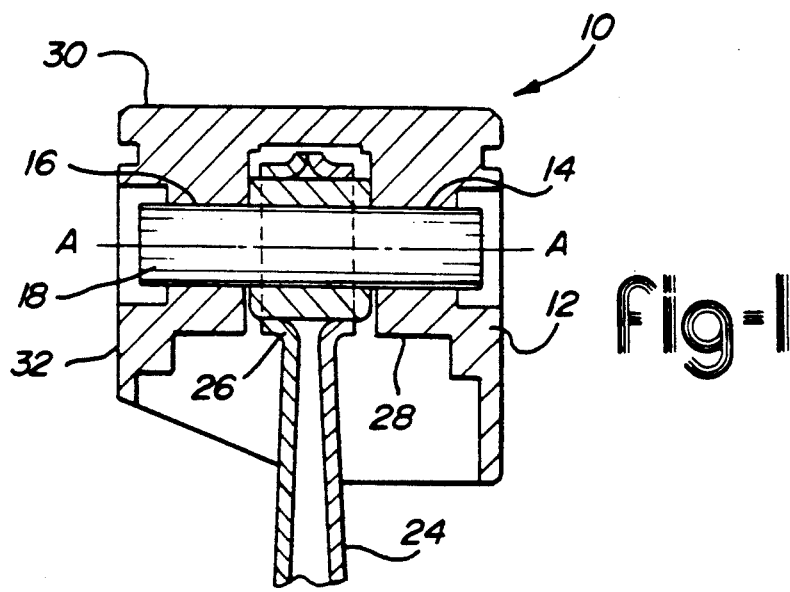
FIG. 1 shows a cross section of an engine component assembly, including a wrist pin.

FIG. 1 depicts an engine component assembly 10 which includes a piston 12. Defined within an underside of the piston 12 is a pair of coaxially spaced holes 14, 16 which are disposed along a longtitudinal axis A—A and formed within associated wrist pin bosses. The holes 14, 16 are diametrically opposed to each other.

Figure 2:
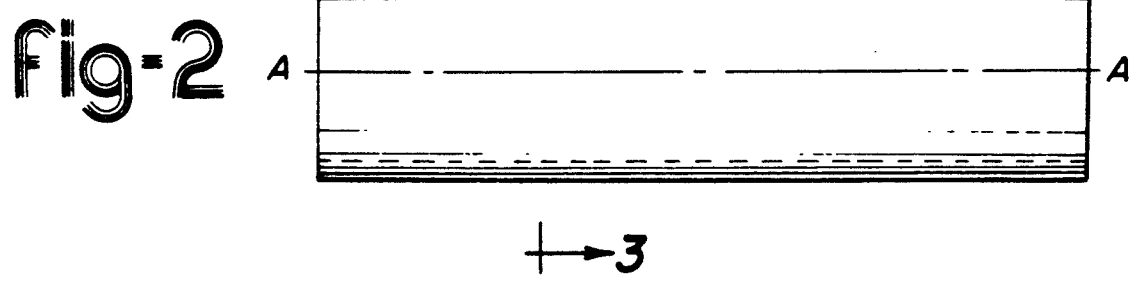
FIG. 2 shows an enlarged side elevational view of the wrist pin of the present invention.
Figure 3:
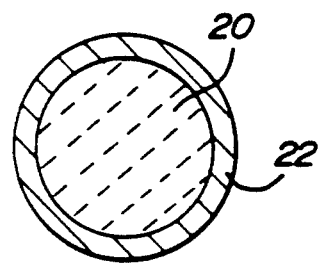
FIG. 3 is a cross section of the wrist pin taken along the line 3—3 of FIG. 2.
Figure 4:
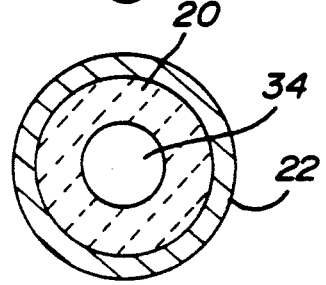
FIG. 4 is a cross sectional view of an alternate embodiment of the piston wrist pin taken along the line 3—3 of FIG. 2.

Extending within and between the holes 14, 16 is a bi-material wrist pin 18, which is best illustrated in FIGS. 2-4. The wrist pin 18 has a cylindrical core 20 disposed coaxially with the longtitudinal axis A—A when installed within the engine component assembly 10.

Surrounding the cylindrical core 20 is a tubular shell 22 which fixedly secures the cylindrical core 20 so that there is no relative movement therebetween. The tubular shell 22 rotates cooperatively within the bearing surface as defined by the holes 14, 16.

Continuing with reference to FIG. 1, the engine component assembly 10 includes a connecting rod 24 which has a piston-connecting or small end 26. The end 26 is adapted to engage the wrist pin 18.

In FIG. 1, the piston 12 is generally cylindrical in shape and has a flat head or crown 30. Extending downwardly from the flat head 30 is a cylindrical skirt 32. The longtitudinal axis A—A is oriented orthogonally to the walls of the cylindrical skirt 32. The wrist pin 18 has a diameter which is sized to cooperate with the bearing surfaces defined by the holes 14, 16 formed within the piston 12.

In the embodiment illustrated, a slight clearance is provided between the wrist pin 18 and the holes 14, 16 so that a slip fit can be achieved. However, it should be realized that a light press or interference fit could be suitable also, especially if the wrist pin 18 is rotatably engaged by the small end 26.

To provide a strong, lightweight wrist pin 18, a ceramic core 20 (FIG. 3) is mated to a tubular metal shell 22. Existing between the cylindrical core 20 and tubular shell 22 is a controlled interference fit such that the tubular shell 22 is in intimate contact with the ceramic core 20 throughout the temperature operating range of the wrist pin 18. The resultant internal pressures induced at room temperature due to the shrink fit are of the order of 3000 psi.

In use, the thin tubular metal shell 22 will absorb most of the required deformation imposed during assembly and operational use.

Optionally, the tubular metal shell 22 may be heat treated to imbue high strength and fatigue resistance. When this step is followed, the temperature to which a tubular steel shell 22 is raised should not exceed 600°-700° F. in order to avoid tempering the shell 22. Good results have been achieved when both the core 20 and the shell 22 are heated in an oven to approximately the same temperature. Since the coefficient of thermal expansion of the ceramic material is less than that of the metallic shell 22, insertion of the core 20 into the shell 22 followed by cooling provides a satisfactory interference fit therebetween. This results in a residual tensile stress in the tubular metal shell 22 and a compressive state of pre-stress in the ceramic cylindrical core 20. This is considered an ideal loading combination for a potentially weaker, brittle ceramic member.

The external surface finish of the tubular metal shell 22 resembles that found in conventional metal wrist pins. Accordingly, no abrasive portions are exposed to the bearing surfaces formed by mating holes 14, 16 within the piston 12, as might otherwise be experienced by a solid ceramic piston pin in frictional engagement with a metallic piston.

The ceramic material of which the cylindrical core 20 is formed displays a higher elastic modulus than conventional piston pins (e.g. case hardenable steels bearing the reference numerals SAE5015, SAE5016, and SAE5115). The ceramic core provides the attributes of low weight, together with high stiffness. Since the ceramic cylindrical core 20 has a higher modulus than the conventional material used in the piston pins of today, the bi-material wrist pin 18 of the present invention provides increased resistance to deformation. This is because the tubular metal shell 22 provides a compliant layer between the piston 12 and the wrist pin 18. The compliant layer accommodates reasonable bending stresses and provides fatigue resistance. Because steel has a lower Young's Modulus than a ceramic, operational loads are distributed over the ceramic cylindrical core 20 more uniformly than if an all-ceramic pin is used.

The tubular metal shell 22 also contains ceramic fragments which may result from fracture. Such fragments may otherwise cause complete destruction of an engine in the event of catastrophic failure of the wrist pin 18.

In practice, the core 20 is a cold pressed and sintered part. It will readily be appreciated that alternative forming methods may include slip casting and injection molding. In making the present invention, the artisan may be provided with a finished part, or a part ready for assembly with a tubular shell, or blank sections which require finishing.

The preferred method for making the wrist pin of the present invention is to shrink the tubular shell 22 around the ceramic core 20. If necessary, the core 20 may be cooled before assembly so that the core may be advantageously poised in a contracted state before insertion into the tubular metal shell 22. If desired, the shell 22 may be poised in a heated (expanded) state before insertion of the cylindrical core 20.

In one embodiment, the cooling step can be satisfactorily performed by immersing the cylindrical core 20 in an environment of liquid nitrogen.

According to the present invention, wrist pins may now be formed with a near net shape, i.e. with minimal or no post-forming, finishing operations.

From external appearances only, the wrist pin 18 superficially resembles wrist pins in use today. But inside, the wrist pin 18 includes a changed interior structure which offers the beneficial operating characteristics described earlier.

Although numerous alternative constituents of the bi-material wrist pin 18 are possible, the preferred components are a steel shell with a sintered silicon nitride cylindrical core 20.

Listed below are possible components of ceramic core and metal shell which lie within the scope of the present invention:

| Ceramic Core | Metal Shell |
| --- | --- |
| Sintered Silicon Nitride | Steel |
| Sintered Silicon Carbide | INVAR |
| Partially Stabilized Zirconia | Stainless Steel |
| Reaction Bonded Silicon Nitride | Aluminum |
| Alumina | |
| Ceramic Composites (Particulates or Whisker) | |
| Fillers: Silicon Carbide | |
| Alumina | |
| Titanium Diboride | |
| Matrix: Silicon Nitride | |
| Silicon Carbide | |
| Metal Matrix Composites | |
| Fillers: Silicon Carbide | |
| Alumina | |
| Titanium Diboride | |
| Matrix: Aluminum | |
| Titanium | |

The sintered silicon nitride preferred is supplied by Ceradyne, located in Santa Ana, Calif. While a core of silicon nitride is disclosed above, it will be apparent that other materials may be suitably deployed. These include SiAlON or silicon carbide. The latter, while not as strong as sintered silicon nitride, is stiffer and has a Young's Modulus of about $60 \times 10^6$ psi (380–400 GPa).

While deployment of a ceramic cylindrical core 20 offers the advantage of reduced mass in comparison to conventional wrist pins, weight may be reduced further by providing an axially extending bore 34 (see, FIG. 4) within the cylindrical core 20. As with other embodiments of the present invention, no machining is needed to provide a satisfactorily cooperating relationship between the wrist pin 18 and the piston 12.

To make an alternative embodiment of the cylindrical core 20, the ceramic core is formed around a mandrel having a longtitudinal axis which is concentric with the outside diameter of the cylindrical core 20.

In practice, the tubular shell 22 may be formed by grinding out an internal diameter of a conventional wrist pin before inserting the ceramic cylindrical core 20 to provide a wall thickness of about 0.020 inches. The length of the cylindrical core 20 measured along the longtitudinal axis A—A must not exceed the length of the tubular shell 22 so that a chamfer (0.05 inches × 45°) may be provided at each end. An interference fit provided between the cylindrical core 20 and the tubular shell 22 is 0.0018 inches nominal (0.002 inches max./0.0016 inches min.).

Experiments have shown that by constructing a wrist pin according to the present invention, weight savings in the range of 40%–50% are realized. For example, a conventional wrist pin weighed 142.9 grams The wrist pin according to the present invention weighed 82.9 grams, a 60.0 gram reduction in weight. Consequent percentage reduction in weight amounted to 41.9%

In practice, the Young's Modulus of the selected ceramic is about $45 \times 10^6$ psi. That made of steel is about $30 \times 10^6$ psi. The ceramics used in the present invention have a density of about 3.2 grams per cc, while that of steel is about 6.8 grams per cc.

While the best mode for carrying out the invention has been described in detail, those familiar with the art to which this invention relates will recognize various alternative designs and embodiments for practicing the invention as defined by the following claims.

We claim:

1. An engine component assembly comprising:
   a piston having a pair of coaxially spaced holes disposed along a longitudinal axis, said holes being diametrically opposed to each other;
   a bi-material wrist pin extending between and within said holes, said wrist pin having
   a single cylindrical ceramic core of uniform circular cross section along its length disposed coaxially with said longitudinal axis, the core having a matrix and a particulated filler; and
   a tubular shell having a length coextensive with the cylindrical core, the shell surrounding and fixedly securing the cylindrical core so that there is no relative motion between the core and the shell, the shell serving as a continuous sleeve and as a compliant layer between the piston and the core so that reasonable binding stresses are accommodated and fatigue is resisted and containing any fracture debris from the ceramic core in the event of failure, said shell rotatably cooperating with the piston within said holes; and
   a connecting rod with a piston-connecting end adapted to secure said bi-material wrist pin so that the pin is fixed in relation to the connecting rod and rotates within the holes.

2. The wrist pin of claim 1, wherein the tubular shell is formed from steel, the steel preventing the ceramic core from failing catastrophically.

3. A wrist pin for rotatably securing a connecting rod to a piston, the wrist pin comprising:
   a cylindrical core, the cylindrical core being formed from a metal matrix composite including:
   a particulated filler selected from the group consisting of silicon carbide, alumina, titanium diboride, and mixtures thereof;
   a matrix selected from the group consisting of titanium, aluminum, and mixtures thereof; and
   a metal tubular shell which surrounds and fixedly secures the cylindrical core, the shell having a length coextensive with the cylindrical core, the shell surrounding and fixedly securing the cylindrical core so that there is no relative motion between the core and the shell, the shell serving as a continuous sleeve which contains any fracture debris from the core and as a compliant layer between the piston and the core so that reasonable binding stresses are accommodated and fatigue is resisted in the event of failure.

4. The wrist pin of claim 3, wherein the cylindrical core has a circular cross section.

5. The wrist pin of claim 3, wherein the cylindrical core is provided with a continuous axially extending bore disposed therewithin.

6. The wrist pin of claim 3, wherein the cylindrical core is formed from a sintered silicon carbide and the tubular shell is formed from INVAR.

7. The wrist pin of claim 3, wherein the cylindrical core is formed from zirconia and the tubular shell is formed from stainless steel.

8. The wrist pin of claim 3, wherein the cylindrical core is formed from silicon nitride and the tubular shell is formed from aluminum.

9. The wrist pin of claim 3, wherein the cylindrical core is formed from alumina.

10. The wrist pin of claim 1, wherein the cylindrical core is formed from a ceramic composite comprising:
    a filler selected from the group consisting of silicon carbide, alumina, titanium diboride, and mixtures thereof; and
    a matrix selected from the group consisting of silicon nitride, silicon carbide, and mixtures thereof.

11. The wrist pin of claim 10, wherein said filler is formed from particulates.

12. The wrist pin of claim 10, wherein said filler is formed from whiskers.

13. A method for making a bi-material wrist pin for rotatably securing a connecting rod to a piston, the wrist pin having a cylindrical ceramic core including a matrix and a particulated filler and a tubular shell which surrounds and fixedly secures the cylindrical ceramic core, the method comprising the steps of:
    heating the cylindrical core to a temperature not greater than 600°–700° F.;
    forming the tubular shell;
    heating the tubular shell to a temperature approximating that of the core to facilitate assembly and to avoid thermal shock when they are juxtaposed;
    inserting the cylindrical core into the tubular shell to form a core-shell assembly; and
    allowing the core-shell assembly to cool to an ambient temperature, thereby shrinking the tubular shell in relation to the cylindrical core so that the core is secured in relation to the shell by an interference pressure fit therebetween and the assembly is formed with a near-net shape such that minimal or no post-forming finishing operations are required.

* * * * *